June 22, 1937.  C. C. FARMER  2,084,675
BRAKE VALVE DEVICE
Filed June 25, 1935

INVENTOR
CLYDE C. FARMER
BY Wm. M. Cady
ATTORNEY

Patented June 22, 1937

2,084,675

UNITED STATES PATENT OFFICE 2,084,675

BRAKE VALVE DEVICE

Clyde C. Farmer, Pittsburgh, Pa., assignor to The Westinghouse Air Brake Company, Wilmerding, Pa., a corporation of Pennsylvania Application June 25, 1935, Serial No. 28,299

9 Claims. (Cl. 303—54)

This invention relates to fluid pressure braking apparatus, and more particularly to a brake valve device of the self lapping type.

It has heretofore been proposed to provide fluid pressure brake equipment employing a triple valve structure adapted to effect a graduated release of the brakes by releasing fluid under pressure from the brake cylinder in accordance with the extent to which the brake pipe pressure is increased.

With a fluid pressure brake of the above type, because of the sensitivity of the triple valve to relatively light variations in brake pipe pressure, it is desirable that the engineer's brake valve device be adapted to maintain the brake pipe pressure against undesired reductions in brake pipe pressure such as might be caused by brake pipe leakage, and that said brake valve device be capable of accurately increasing brake pipe pressure in the desired stages, in effecting a graduated release of the brakes, in response to proper manipulation of the brake valve handle.

The principal object of my invention is to provide a brake valve device fulfilling the above requirements.

Another object of my invention is to provide a brake valve device adapted to effect a reduction or increase in brake pipe pressure to a predetermined degree according to the position to which the brake valve handle is moved, and operative to maintain that degree of brake pipe pressure against leakage of fluid from the brake pipe.

Another object of my invention is to provide a brake valve device by means of which the application and release of fluid pressure brakes of the above type may be easily and accurately graduated, and which is also adapted to be operated, if necessary, in connection with the more widely used freight brake equipment not embodying a graduated release feature.

Other objects and advantages will appear in the following more detailed description of the invention.

Figure 1:
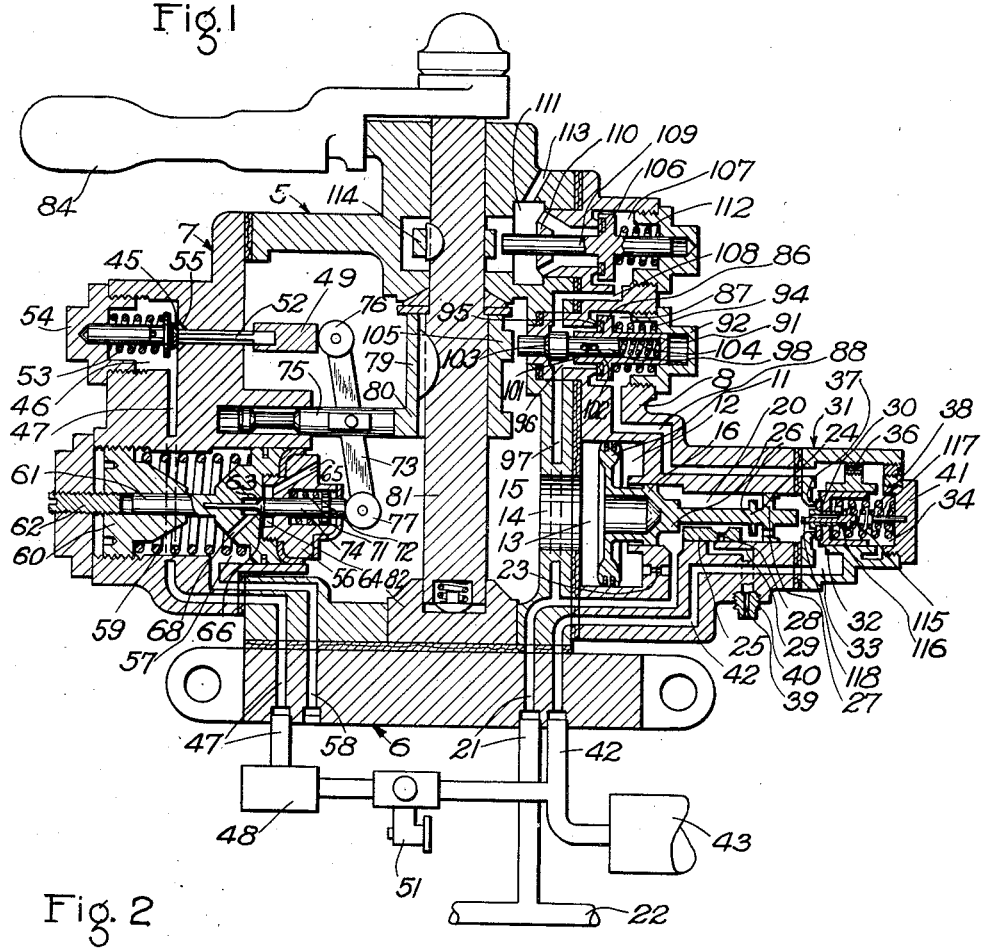
Figure 2:
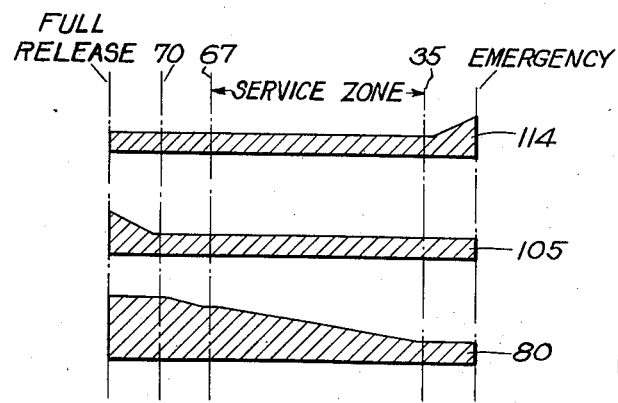

In the accompanying drawing; Fig. 1 is a diagrammatic sectional view of a brake valve device embodying my invention; and Fig. 2 is a diagrammatic view showing a development of the cam contours of the cams shown in Fig. 1.

As shown in the drawing, the brake valve device comprises a casing section 5 mounted on a pipe bracket 6, a regulating portion 7, and a valve portion 8.

Contained in the valve portion 8 of the brake valve device is a relay valve mechanism which comprises an equalizing piston 11 having at one side a chamber 12 and at the other side a chamber 13, which is in constant communication through an opening 14 with a central pressure chamber 15 in the casing section 5. The application piston is provided with a baffle piston 16 which is slidably mounted in a suitable bore in the casing and is disposed between the chamber 12 and a valve chamber 20. The valve chamber is connected through a passage and pipe 21 with a brake pipe 22, said passage being connected to the chamber 12 through a restricted passage 23.

The equalizing piston 11 is provided with a stem 24 extending into valve chamber 20, which contains a brake pipe discharge valve 25 adapted to be operated by engagement with one or the other of shoulders 26 formed on said stem. The discharge valve 25 has a position in which a port 28 in said valve is adapted to connect the chamber 20 through a passage 29 and a passage 39 in choke plug 40 to atmosphere. A perforate member 27 is provided on the end of the stem 24 for guiding said stem, and is adapted to operate a supply valve device contained in a member 31 which is secured to the casing of the valve portion 8.

The supply valve device comprises a valve piston 30 slidably mounted in a cylinder 32 formed in member 31, said piston and cylinder defining a chamber 33, connected through a passage and pipe 42 to a main reservoir 43, and a chamber 34, which is connected through a choked passage 36 with said chamber 33. A spring 38 is disposed in chamber 34 between the valve piston and a cap nut 41, for urging said valve piston into engagement with a seat rib 37. Disposed within the valve piston is a pilot valve 115, which is urged toward a seat 116 by a spring 117. The pilot valve has a grooved stem 118 projecting beyond valve piston 30 into valve chamber 20.

The regulating portion 7 comprises a self-lapping valve mechanism adapted to control the pressure of fluid in the chamber 15 acting on the equalizing piston 11. An inlet valve 45 is provided in a valve chamber 46, which is in constant communication through a passage and pipe 47 with a volume reservoir 48, which in turn is connected to the supply port of a feed valve device 51 of the usual construction, the intake port of said device being connected to the main reservoir 43. The inlet valve 45 has a fluted stem 52 slidably mounted in a bore in the portion 7 and extending into the chamber 15 where a cap member 49 is fitted to the end of said stem. A spring 53 is disposed between the inlet valve and a cap nut 54 for urging said valve toward a seat 55 formed on the wall of chamber 46.

Slidably mounted in a piston bore in the regulating portion 7 is a piston 56, which is exposed on the inner side to chamber 15 and has on the opposite side a chamber 57, open to atmosphere through a passage 58. A metering spring 59 contained in chamber 57 is disposed between the piston and an adjusting member 60 which has screw-threaded connection with the portion 7, and a stem 61 on said piston is adapted to engage a stop member 62 for limiting outward movement of said piston. The piston 56 has an interior valve chamber 64 open to chamber 15 through a passage 65, and carries therein a vent valve 66, which is adapted to engage a seat 63 formed on the piston for controlling communication between said valve chamber and a passage 68 leading to chamber 57. The vent valve 66 has a stem 74 extending into the chamber 15, and a spring 71 is fitted between the piston 56 and a collar 72 on said stem for urging said valve from the seat 63.

For controlling the operation of the inlet and vent valves 45 and 66 respectively, a cam mechanism is provided in chamber 15, comprising a lever 73 which is pivotally connected, intermediate its ends, to a plunger 75, one end of which is mounted to slide in a suitable bore in the portion 7. The lever 73 carries at one end a roller 76 which operatively engages the cap member 49 of the inlet valve stem 52, and has at the opposite end a roller 77 which operatively engages the end of the stem 74 of the vent valve 66.

A cam member 79 is provided in chamber 15 having a cam face 80 adapted operatively to engage the free end of the plunger 75, said cam member being keyed to a control shaft 81, which is rotatably mounted in a suitable bore in casing section 6 and in a bearing member 82 secured to said casing section. The operating shaft and cam may be operated through the medium of a handle 84.

In order to permit rapid and positive charging of the brake pipe in effecting a release of the brakes, the valve portion 8 is provided with a full-release device, which is operable through the medium of the control shaft 81.

The full-release device comprises a valve 86 disposed in a valve chamber 87, which is connected by way of a passage 88 with the chamber 33 and consequently with the main reservoir 43, said valve being provided with a hollow stem 91 slidably mounted in a suitable bore in a cap nut 92 having screw-threaded connection with the casing for closing the outer end of chamber 87. A spring 94 is disposed in chamber 87 between the valve 86 and the cap nut 92 for urging said valve into engagement with a seat rib 95, which is formed on the casing adjacent a chamber 96. The latter chamber is connected through a passage 97 with the brake pipe passage 21 and contains a plunger 98, one end of which is operatively mounted in the hollow stem 91 by means of a pin 101 secured to said stem and fitted through a slot 102 in said plunger, and the opposite end of which is slidably mounted in a suitable bore in the casing, extending into the chamber 15.

The plunger 98 carries a collar 103, and a spring 104 disposed within the hollow stem 91 acts against the end of said plunger and normally holds said collar in sealing engagement with a seat formed on the casing at the inner end of the plunger bore, thereby preventing leakage of fluid under pressure between chamber 15 and 96. A cam face 105 is provided on cam member 79, operatively aligned with the plunger 98 and adapted to engage said plunger in full release position of the brake valve device as shown in Fig. 2 of the drawing.

An emergency brake pipe exhaust device is provided in the valve portion 8, adapted to permit a complete reduction in brake pipe pressure. This device comprises an exhaust valve 106 contained in a chamber 107, which communicates with chamber 96 through a passage 108, and carried by an operating plunger 109 which is slidably mounted in an apertured wall 110. The exhaust valve is adapted to control a communication from chamber 107 to a chamber 111, which chamber is open to atmosphere by way of a passage 113, a spring 112 being provided in chamber 107 for normally holding said valve seated. A cam 114, which is keyed to the control shaft adjacent the emergency device, is adapted operatively to engage the free end of the plunger 109 upon movement of the brake valve handle into emergency position.

With the brake valve device in running position as shown in the drawing, the cam 80 bears against the free end of the plunger 75 and thereby positions the pivotally connected lever 23 so that said lever maintains inlet valve 45 unseated through the medium of roller 76, member 49, and stem 52, while holding vent valve 66 seated on seat 63 by means of roller 77 and stem 74. It should be understood that the compression value of the inlet valve spring 53 is greater than that of vent valve spring 71, and that the compression value of the metering spring 59 is greater than the combined compression values of springs 53 and 71. With the inlet valve 45 maintained unseated, the pressure chamber 15 and connected chamber 13 are charged with fluid at the usual reduced pressure as supplied by the feed valve device 51 by way of the volume reservoir 48, pipe and passage 47, chamber 46, and past the fluted stem 52.

It will be apparent that, by adjusting the metering spring 59 for the maximum pressure to be carried in chamber 15, which may preferably be 70 lb. per sq. in., the feed valve device 51 and volume reservoir 48 might be omitted. Because, however, of the tendency inherent in a self-lapping valve structure to "wire-draw" or restrict the feed of fluid as its pressure approaches maximum, the feed valve device is preferably provided for supplying fluid at the 70 lb. per sq. in. maximum pressure, the metering spring 59 being adjusted for a pressure sufficiently under the maximum, or in this case, 67 lb. per sq. in., thereby obviating the above difficulty.

Fluid under pressure supplied to the piston chamber 13 acts against and moves the equalizing piston 11 inwardly, i. e., in a direction toward the right-hand, thereby causing stem 24 to shift the discharge valve 25 to a lap position in which the atmospheric exhaust port 28 is blanked. Continued movement of piston 11 then causes the member 27 to engage the stem 118 and to move pilot valve 115 out of seating engagement with the seat 116 against the pressure of spring 117, thereby releasing fluid under pressure in chamber 34 past the grooved stem to valve chamber 20 at a rate faster than it can be supplied to said valve chamber by way of choked passage 36. Fluid pressure on the outer side of the valve piston 30 is thus released so as to unload said valve piston, which can then be unseated by a relatively small pressure at its end. With valve piston 30 unseated, fluid under pressure is supplied from the main reservoir 43 through pipe and passage 42, chamber 33, and past the valve piston to chamber 20, and thence through passage and pipe 21 to the brake pipe 22, charging said brake pipe. At the same time, fluid under pressure is supplied from the passage 21 through restricted passage 23 to the chamber 12.

As the pressure of fluid building up in brake pipe 22 and in the connected chamber 12 approaches that maintained in chamber 15 by operation of the feed valve device 51, the pressures acting on opposite sides of the piston 11 are gradually equalized. The pressure of spring 38 acting through the medium of piston valve 30, member 27, and stem 24 then causes piston 11 to move inwardly, thereby permitting said piston valve to seal against the seat rib 37, shutting off further supply of fluid under pressure from the main reservoir to the brake pipe.

Should leakage of fluid from the brake pipe 22 subsequently reduce the fluid pressure in said brake pipe and consequently in chamber 12 below that maintained in chamber 15, the pressure of said chamber 15 will again move the equalizing piston 11 outwardly, causing the piston valve 30 to be unseated, so as to supply fluid under pressure from the main reservoir 43 to said brake pipe in the manner hereinbefore described, until the opposing pressures acting against said equalizing piston are again equalized.

It will thus be evident that the relay valve device in the valve portion 8 is operative to maintain the brake pipe constantly charged with fluid from the main reservoir at a pressure corresponding to that maintained in chamber 15 by the feed valve and by the self-lapping valve mechanism in the regulating portion 7.

If it is desired to effect a service application of the brakes, the handle 84 is moved to rotate the shaft 81, thereby turning the cam face 80 to the desired position within the service zone on the brake valve quadrant, so that said cam face withdraws sufficiently, relative to the plunger 75, to permit movement of said plunger to the right and operation of the self-lapping valve mechanism. The spring 53, being stronger than spring 71, then moves the stem 52 inwardly, tilting lever 73 about the roller 77 as a fulcrum until the inlet valve 45 engages a seat 55, whereupon spring 71 is permitted to move stem 70 inwardly, swinging lever 73 about roller 76, and unseating the vent valve 66. With the vent valve unseated, fluid under pressure is vented from chamber 15 by way of passage 65, valve chamber 64, passage 68, chamber 57, and passage 58 to atmosphere. Upon the consequent reduction of fluid pressure in chamber 15, the spring 59 acts to move the piston 56 inwardly until valve seat 63 is brought into engagement with the exhaust valve 66, which is positioned by the cam mechanism, thus lapping said valve and checking further reduction of fluid pressure in chamber 15.

The reduction of fluid pressure in chamber 15 and the connected chamber 13 permits the brake pipe pressure acting in chamber 12 to operate the equalizing piston 11, moving discharge valve 25 through the medium of stem 24 toward the left-hand until the port 28 registers with passage 29. Fluid under pressure is then discharged from brake pipe 22 by way of pipe and passage 21, valve chamber 20, port 28, passage 29, and passage 39 to atmosphere, the consequent reduction in brake pipe pressure effecting a service application of the brakes in the usual manner. When the pressure of fluid in the brake pipe has reduced sufficiently, the fluid pressure bottled up in chamber 15 moves piston 11 toward the right-hand, thereby sliding the discharge valve to close the communication from the valve chamber 20 to atmosphere.

In order to effect a graduated release of the brakes, the handle 84 is gradually moved toward release position in several successive steps, each step effecting a further partial increase in brake pipe pressure, so that the graduated release type triple valve devices are thereby so controlled as to permit the braking force to be graduated off in accordance with the deceleration of the train.

When the handle 84 is thus moved from an application position toward release position, the cam face 80 is rotated against the plunger 75, thereby forcing said plunger and the pivotally connected lever 73 outwardly, and through operation of said lever causing the roller 76 to move member 49, and stem 52 outwardly, unseating the inlet valve 45. With the inlet valve unseated, fluid under pressure is supplied from the main reservoir through the medium of feed valve device 51 to the volume reservoir 48 and thence through pipe and passage 47, valve chamber 46, and past valve 45 and fluted stem 52 to the chamber 15. The pressure of chamber 15 then increases and the piston 56 is consequently moved outwardly against the pressure of spring 59, the lever 73 at the same time being operated by spring 53 acting through the medium of inlet valve 45, stem 52, member 49 and roller 76, to permit said inlet valve to move toward the seat 55. The inlet valve will thus be seated to close off further supply of fluid under pressure to chamber 15 upon the build-up of pressure in said chamber corresponding to the position of the cam 80.

As the fluid pressure in chamber 15 and connected chamber 13 increases, the equalizing piston 11 is moved outwardly, said piston, through the medium of piston stem 24 and member 27, operating pilot valve 115 to unload valve piston 30 and effecting the unseating of said valve piston. Fluid under pressure is then supplied from main reservoir 43 through pipe and passage 42, chamber 33, past the open valve to chamber 20, and thence through passage and pipe 21 to the brake pipe 22, and also by way of restricted passage 23 to the chamber 12. Upon the equalization of the pressure of fluid in the brake pipe and in the connected chamber 12 with that in chamber 15, the springs 117 and 38 are enabled to seat pilot valve 115 and piston valve 30 respectively, the member 27, stem 24, and equalizing piston 11 being shifted inwardly.

It will be evident that the brake pipe pressure may be further increased by moving the brake valve handle 84 a further step toward full release position, when the above described operation will be repeated.

If the handle 84 is moved to full release position, the cam member 79 is rotated so that cam face 105 operatively engages the free end of the plunger 98 of the full release device and moves said plunger initially against the opposing pressure of spring 104 until the pin 101 engages hollow stem 98 at the limit of slot 102. Further movement of the cam then unseats valve 86 against the pressure of spring 94, permitting fluid at main reservoir pressure to flow from chamber 33 through passage 88, chamber 87, past the unseated release valve, through chamber 96, and passage 97 to the brake pipe passage 21, thereby insuring rapid charging of the brake pipe.

It will be noted that the self-lapping valve mechanism in the regulating portion 7 is adapted to control brake pipe pressure through a service application range which may preferably be from 67 lb. per sq. in. pressure to 35 lb. per sq. in., thus permitting a brake pipe reduction adequate to insure a maximum service application of the brakes. To effect a complete reduction of the pressure of fluid in the brake pipe, the handle 84 is moved to emergency position in which the cam 114 is turned into operative engagement with the stem 109 of emergency valve 106, said valve being thereby unseated against the pressure of spring 112. With valve 106 held unseated, fluid under pressure is vented at an emergency rate from brake pipe 22 by way of pipe and passage 21, passage 97, chamber 96, passage 108, chamber 107, past said valve, and through chamber 111 and passage 113 to atmosphere. To release the brakes following an emergency application, the handle 84 is moved to full release position, thereby effecting the full release operation as hereinbefore described.

The brake valve device constructed according to my invention is thus adapted to control the application and release of the brakes in a fluid pressure brake system having a graduated release function, and is automatically operative to prevent undesired reductions in brake pipe pressure, such as might be caused by brake pipe leakage. It will be clear that my brake valve device may also be used in connection with a fluid pressure brake system of the usual type, since it is capable of effecting substantially all the operative functions controlled by an ordinary brake valve designed for such a system.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a reduction in fluid pressure in which is operative to effect an application of the brakes, of a brake valve device comprising a casing having a chamber, self-lapping valve means for supplying fluid to said chamber at a pressure depending upon the extent of movement of the brake valve device, and means for supplying fluid under pressure to the brake pipe according to the pressure of fluid supplied to said chamber.

2. In a fluid pressure brake, the combination with a brake pipe, a reduction in fluid pressure in which is operative to effect an application of the brakes, of a brake valve device comprising a casing having a chamber, self-lapping valve means for supplying fluid to said chamber at a pressure depending upon the extent of movement of the brake valve device, and valve means subject to the opposing pressures of said chamber and the brake pipe for supplying fluid under pressure to said brake pipe.

3. In a fluid pressure brake, in combination, a main reservoir, a brake pipe, a reduction in fluid pressure in which is operative to effect an application of the brakes, a brake valve device comprising means for supplying and releasing fluid under pressure to and from the brake pipe corresponding with the fluid pressure in a chamber and according to the position of the brake valve device, and independent valve means operative in one position of the brake valve device for also supplying fluid under pressure from the main reservoir to the brake pipe.

4. In a fluid pressure brake, in combination, a main reservoir, a brake pipe, a reduction in fluid pressure in which is operative to effect an application of the brakes, a brake valve device comprising means for supplying and releasing fluid under pressure to and from the brake pipe corresponding with the fluid pressure in a chamber and according to the position of the brake valve device, valve means operative in one position of the brake valve device for supplying fluid under pressure from the main reservoir to the brake pipe, and other valve means operative in another position of the brake valve device for venting fluid under pressure from the brake pipe.

5. In a fluid pressure brake, in combination, a brake pipe, a main reservoir, a supply reservoir, a feed valve device for supplying fluid under pressure from the main reservoir at a reduced pressure to said supply reservoir, and a brake valve device for supplying fluid under pressure to the brake pipe in accordance with the pressure in a chamber and having valve means for controlling the supply of fluid under pressure from said supply reservoir to said chamber.

6. In a fluid pressure brake, in combination, a brake pipe, a main reservoir, a supply reservoir, a feed valve device for supplying fluid under pressure from the main reservoir at a reduced pressure to said supply reservoir, and a brake valve device for supplying fluid under pressure to the brake pipe in accordance with the pressure in a chamber and having self-lapping valve means for supplying fluid under pressure from said supply reservoir to said chamber at a pressure dependent upon the extent of movement of the brake valve device.

7. In a fluid pressure brake, in combination, a brake pipe, a reduction in pressure in which is adapted to effect an application of the brakes, a valve device subject to the opposing pressures of the brake pipe and a chamber for controlling the supply and release of fluid under pressure to and from the brake pipe, and a brake valve device movable to different positions for varying the fluid pressure in said chamber according to such movement, said brake valve device having independent valve means operative in an emergency position to vent fluid under pressure from said brake pipe.

8. In a fluid pressure brake, in combination, a brake pipe, a reduction in pressure in which is adapted to effect an application of the brakes, a valve device subject to the opposing pressures of the brake pipe and a chamber for controlling the supply and release of fluid under pressure to and from the brake pipe, and a brake valve device movable to different positions for varying the fluid pressure in said chamber according to such movement, said brake valve device having independent valve means operative in an emergency position to vent fluid under pressure from said brake pipe, and other valve means operative in a full release position to supply fluid under pressure to said brake pipe.

9. In a fluid pressure brake, in combination, a brake pipe, a brake valve device having a chamber, means for supplying fluid under pressure to the brake pipe according to the pressure of fluid in said chamber, valve means for controlling the supply of fluid under pressure to said chamber, manually operable means for operating said valve means to permit the supply of fluid under pressure to said chamber, a spring, and means subject to the opposing pressures of said spring and said chamber for effecting the operation of said valve means to cut off the supply of fluid under pressure to said chamber upon a predetermined increase in fluid pressure in said chamber.

CLYDE C. FARMER.